Dec. 25, 1923.
S. G. NEAL
AIR BRAKE APPARATUS
Filed May 23, 1923   3 Sheets-Sheet 2
1,478,832
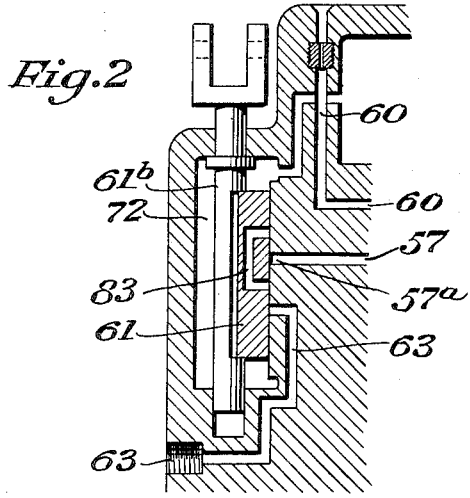
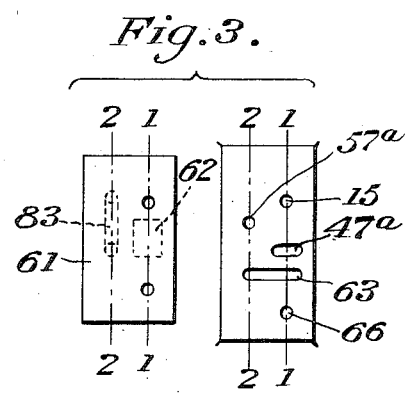
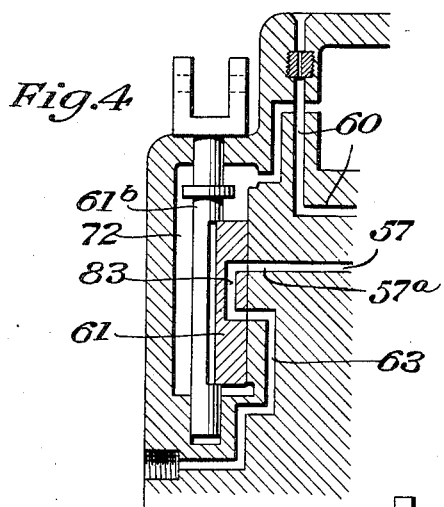
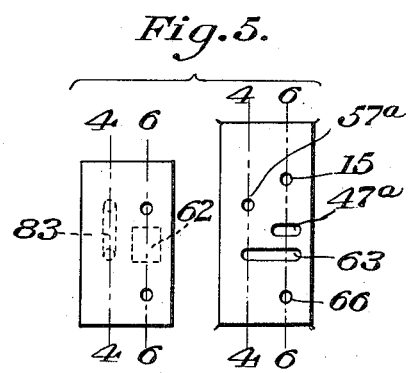
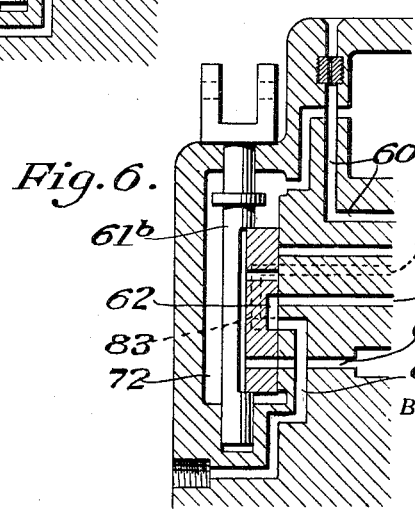
INVENTOR
Spencer G. Neal
BY
ATTORNEYS Service Lap Patented Dec. 25, 1923.

1,478,832

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed May 23, 1923. Serial No. 640,893.

*To all whom it may concern:*

Be it known that I, SPENCER G. NEAL, a citizen of the United States, and resident of the borough of Manhattan, city, county, and State of New York, have invented certain new and useful Improvements in Air-Brake Apparatus (Case No. 47), of which the following is a specification.

This invention relates to improvements in triple valves for air brake apparatus. The invention is shown as applied to a triple valve constructed and operating in accordance with Patent #1,418,961, dated June 6, 1922. It will therefore be unnecessary to describe herein the entire construction and the complete operation of the triple valve. Only such parts of the triple valve operating in direct relation with and in direct cooperation with the present invention will be described.

Figure 1:
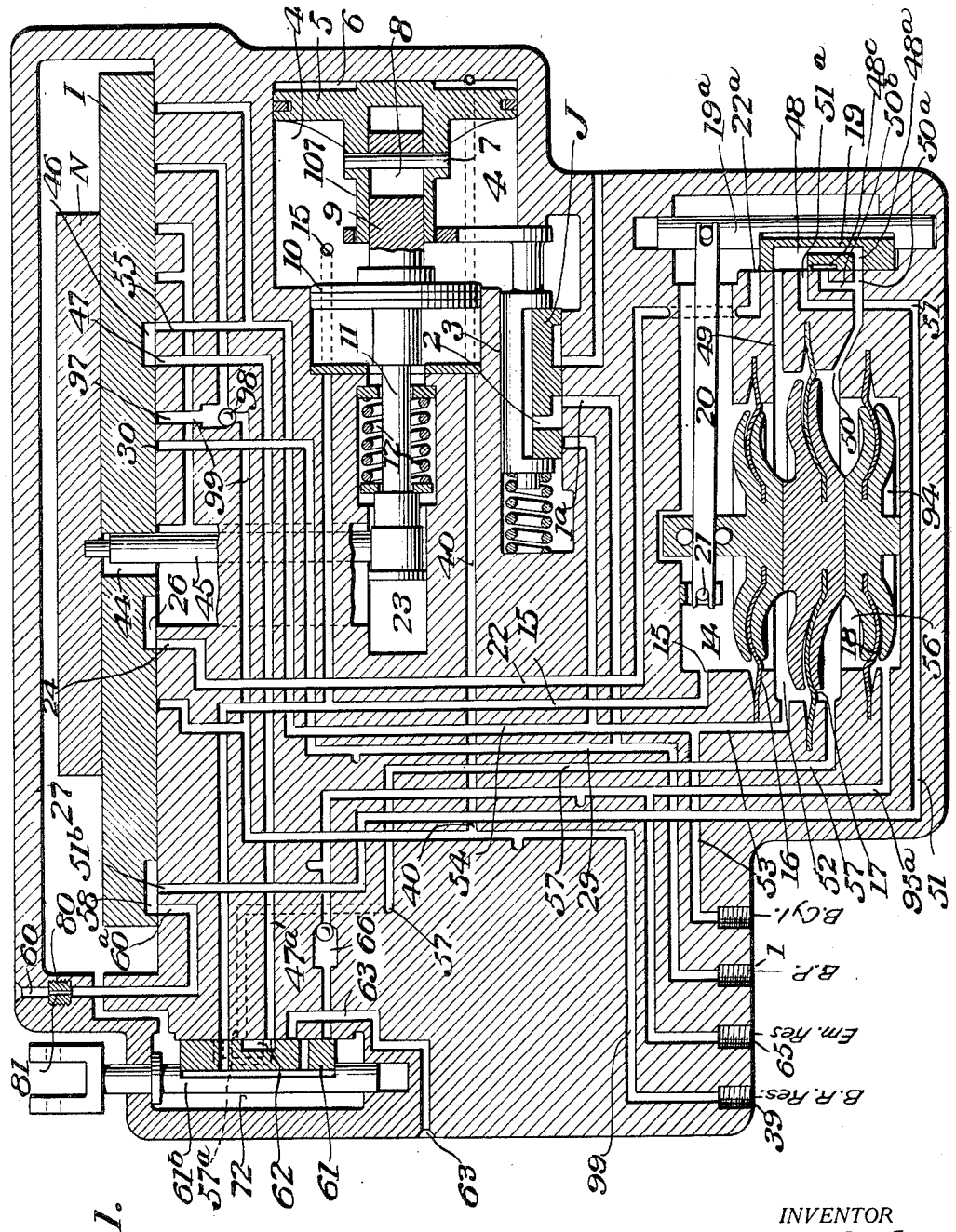
Figure 7:
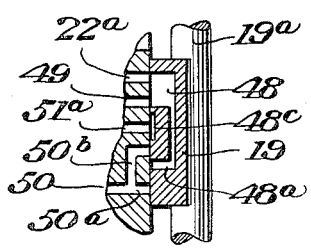
Figure 8:
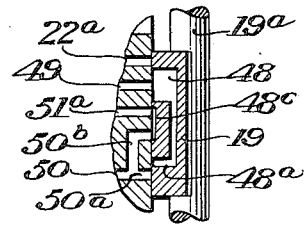
Figure 9:
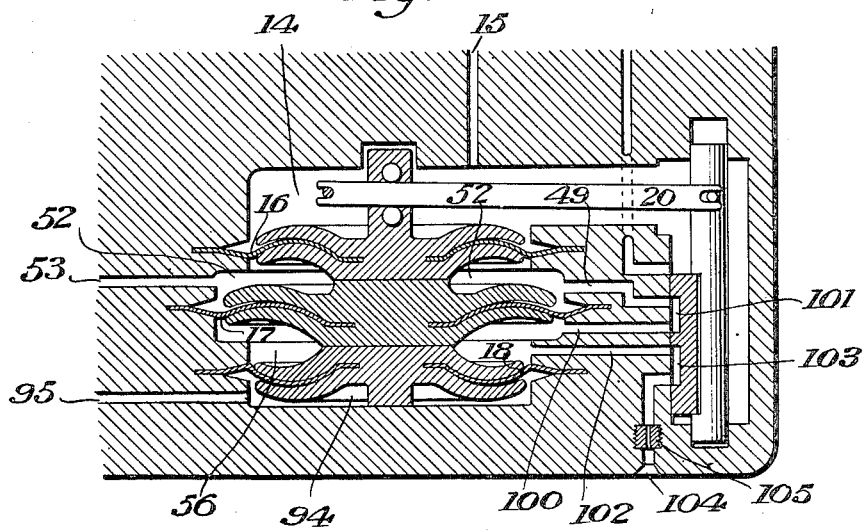

In the drawings, Fig. 1 is a diagrammatic view of a triple valve with the invention applied thereto, the parts being in full release position with the release governing valve in graduated release position, the section through the release governing valve being taken on the lines 1—1 of Fig. 3;

Fig. 2 a detail sectional view showing the release governing valve in graduated release position, the section being taken on the lines 2—2 of Fig. 3;

Fig. 3 a diagrammatic view of the release governing valve and its seat, the parts being in the relative positions which they occupy when the release governing valve is in graduated release position;

Fig. 4 a detail sectional view of the release governing valve taken on the lines 4—4 of Fig. 5 with the release governing valve in quick release position;

Fig. 5 a diagrammatic view of the release governing valve and its seat, the parts being in the relative positions which they occupy when the release governing valve is in quick release position;

Fig. 6 a detail sectional view similar to Fig. 4 taken on the lines 6—6 of Fig. 5;

Fig. 7 a detail view of the pilot valve in service position;

Fig. 8 a detail view similar to Fig. 7 showing the pilot valve in lap position; and Fig. 9 a detail diagrammatic view of a slightly different form of the invention.

In operating trains equipped with the present standard freight brake, such as the well known Westinghouse K type of triple valve, it is the usual practice to turn up pressure retainers when descending a grade. The purpose of the retainer is to hold a certain pressure in the brake cylinder while releasing the brakes and re-charging the auxiliary reservoir. When descending grades with the trains equipped with the ordinary standard freight brake of the Westinghouse type it is the practice to apply the brakes to retard the speed of the train; to hold the brakes applied for a brief period, about thirty or forty seconds; to then release the brakes and re-charge the auxiliary reservoir, this release and recharging period being short, usually forty to sixty seconds; and then if the grade is long and heavy to again apply the brakes for a brief period and to again release them and re-charge the auxiliary reservoir. This operation is what is known as cycling and it is continued during the entire run down the grade. If the grade is heavy the application and holding and the release and re-charging operations follow each other rapidly and are of short duration. It is essential that the release and re-charge operations shall be as short as possible and be followed immediately by a re-application of the brakes in order to prevent undue acceleration of the train on the grade.

The retainers are weighted or loaded valves which retain a certain portion of the brake cylinder pressure during the period of release and re-charge. These retainers have what is called a certain "value", that is to say, they are constructed to retain a certain number of pounds pressure in the brake cylinder, and that fixes the value of the retainers. These values vary for different grades. A retainer of light value will be used on trains running down low grades and a retainer of high value will be used on trains running down heavy grades. The heavy value retainers retain a heavier pressure in the brake cylinders during the release and re-charging period.

With the brake equipment in theoretically perfect condition and the retainers turned up, that is to say, placed in operation, the cycling results in a building up of brake cylinder pressure in excess of the normal brake cylinder pressure produced by a single brake pipe reduction for a single application of the brakes. This results from the fact that the retainer holds a certain pressure in the brake cylinder so that upon the next application of the brakes the usual quantity of air is admitted to the brake cylinder on top of that retained therein. This results in the added brake cylinder pressure over and above that which would have been produced by a single brake application.

In Patent #1,418,961 the brake cylinder pressure developed is in direct proportion to the extent of the brake pipe reduction, the developed brake cylinder pressure controlling the movement of the triple valve to service lap position. It is, therefore, clear that if the ordinary weighted or loaded retainers were applied to said triple valve the brake cylinder pressure would not be built up by a cycling operation. The brake cylinder pressure would be developed during each application only in proportion to the brake pipe reduction because when that degree of brake cylinder pressure was reached the triple valve would go to service lap position.

It is the main object of this invention to provide means whereby brake cylinder pressure may be built up in direct relation to the rapidity of cycling operations, said means being controlled entirely and solely by the operation of the triple valve parts.

Another important object of the invention is to provide means whereby the triple valve in cycling operations will automatically build up the brake cylinder pressure above that which would be normally obtained from a given brake pipe reduction, the said build-up of brake cylinder pressure being wholly dependent upon the rapidity of the cycling operations so that on low grades the brake cylinder pressure will not be built up as high as on heavy grades where the cycling operations are frequent and of short duration.

Another important object of the invention is to provide in a triple valve an automatically operating brake cylinder pressure retention means so that the ordinary well known weighted or loaded pressure retainer may be dispensed with.

Another object of the invention is to combine the automatic brake cylinder pressure retention means with a release governing valve so that when said release governing valve is in graduated release position the pressure retention means will be operative but when said release governing valve is in quick release position the said retention means will be inoperative.

There are other important objects and advantages of the invention which will appear hereinafter and which will be obvious to those skilled in the art to which this invention relates.

The triple valve body is provided with a brake pipe connection 1 which is in direct communication with a port 1ª of the emergency valve seat. The emergency slide valve J is formed with a port 2 which is adapted to co-operate with port 1ª and place the brake pipe in communication with the main brake pipe chamber 4 of the triple valve. The port 2 opens directly into an emergency valve chamber 3, which chamber is in direct and open communication with the main brake pipe chamber 4 so that chamber 3 is actually a part of brake pipe chamber 4. Chamber 4 is enlarged to form a cylindrical chamber 6 in which reciprocates the large emergency piston 5, said piston forming one wall of the chamber 6 and being subject on one side to the brake pipe pressure in chamber 4 and on its other side to the pressure in chamber 6. Axially in line with chamber 6 is formed a smaller cylindrical chamber adapted to receive the main actuating piston 10, said piston being smaller than the emergency piston and axially in line therewith but on the opposite side of chamber 4. The main actuating piston is provided with an outwardly extending stem 9 which is adapted to fit within an inwardly extending tubular extension 107 of the emergency piston. The stem 9 is formed with a vertical slot 8 and the tubular extension of the emergency piston carries a vertical pin 7 which extends through said slot so that the two pistons may have a limited independent movement. The main actuating piston is provided with a piston stem 11 which extends inwardly into a supplemental brake pipe chamber 23, said chamber 23 being on one side of the actuating piston and the main brake pipe chamber being on the other side thereof, so that said piston will move in response to variations in pressure in said two chambers. A graduating spring 12 surrounds the inner end of the main piston stem. The main piston stem is provided with an upstanding post or stem 45 which operates through a slot in the main slide valve seat and is adapted to engage the main slide valve I. The main slide valve is formed with an operating slot 44 which permits a limited movement of the operating stem 45 without movement of the slide valve. The upper end of the stem 45 engages the graduating valve N so that said valve will always move with the actuating stem. The graduating valve and the main slide valve are maintained on their seats by suitable springs, and said valves reciprocate in the main slide valve chamber 27.

The controller section of the triple valve contains the means for controlling the brake cylinder pressure and said controller section is formed with an actuating chamber 14 which is connected directly to the main brake pipe chamber 4 through passage 15 so that chamber 4 pressure will always be registered in the actuating chamber. The lower wall of the actuating chamber is formed by a diaphragm 16. Below the actuating diaphragm, and spaced therefrom a suitable distance, is arranged a controlling diaphragm 17. The controlling diaphragm is somewhat larger in area than the actuating diaphragm. Below the controlling diaphragm and spaced therefrom a suitable distance is arranged an emergency reservoir diaphragm 18 equal in area to diaphragm 16. Each diaphragm is supported at its center by suitable clamping disks, the disks of the three diaphragms abutting against each other so that all of the diaphragms may move together. Between the diaphragms 16 and 17 is formed a controlling chamber 52 which is in direct communication with the brake cylinder through passage 53. This chamber is also in communication with a port in the pilot valve seat through a passage 49. Between the diaphragms 17 and 18 is formed a brake cylinder pressure retention chamber 56 which chamber is connected by a passage 50 to a port 50$^a$ in the pilot valve seat. Below the emergency diaphragm 18 is formed an emergency reservoir chamber 94 which chamber is at all times in communication with the emergency reservoir through passage 95$^a$.

The interior of the pilot valve casing is in direct open communication with chamber 14 so that chamber 4 pressure will be registered in the pilot valve casing. A pilot slide valve 19 is secured to a vertically movable stem 19$^a$ which is mounted to reciprocate and the upper end of which is operatively connected to the free end of a pilot valve lever 20 which extends into the actuating chamber. The actuating diaphragm is provided with an upwardly extending central stem which is vertically slotted for the passage of the pilot valve lever, said lever being operatively connected to said stem. The inner end of the lever is fulcrumed on a pin 21 supported in a suitable bracket mounted in the chamber 14 so that as the diaphragms are moved, lever 20 will be moved to operate the pilot valve. The movements of the diaphragms are limited by suitable stops.

The pilot valve slide valve 19 is formed with a deep groove or cavity 48 in its face and with a port 48$^a$ connected thereto, said cavity and said port being adapted to cooperate with the passage 49 leading to the controlling chamber 52; port 50$^a$ and passage 50 leading to the retention chamber 56; and with port 22$^a$ and passage 22 which leads to a port 24 in the main slide valve seat. When the pilot valve is in application position brake pipe air flows from chamber 23 through a groove 26 in the main slide valve, port 24, passage 22, port 22$^a$, groove 48 in the pilot valve and passage 49 and chamber 52 and thence to the brake cylinder through passage 53. When the pilot valve is in release position brake cylinder air flows through chamber 52, passage 49, groove 48 and port 48$^a$ of the pilot valve, port 50$^a$ and passage 50 into the retention chamber 56, and to atmosphere, as hereinafter described.

The brake pipe is connected by passage 29 to the brake pipe port 30 in the main slide valve seat. The main slide valve seat is also formed with a brake cylinder port 55 connected by a passage 54—53 to the brake cylinder. The main slide valve seat is also formed with a port 97 which is connected by passage 99 with a passage leading to the brake pipe reservoir connection 39. In this passage is arranged a check valve 98 which seats toward the connection 39 so that air can not pass from port 97 to the brake pipe reservoir but may pass from said reservoir back to the port 97. The brake pipe reservoir connection 39 is connected through passage 40 with the chamber 6 so that brake pipe reservoir pressure will always be registered in chamber 6 and against one side of the emergency piston.

The emergency reservoir is connected to the triple valve through passage 65 which extends into a chamber 66 close to the release governing valve seat. The release governing valve 61 is mounted in valve chamber 72 and is connected to a manually reciprocable bar 61$^b$ mounted in the valve casing. One end of this bar projects beyond the casing to provide means whereby it may be shifted in order to place the release governing valve in quick release position or in graduated release position. The valve 61 is formed with a release groove 62 in its face which is adapted to connect brake cylinder release passage 47$^a$ to the exhaust port and passage 63. Exhaust passage 47$^a$ extends to the exhaust port 47 in the main slide valve seat. When the release governing valve is in the position shown in Figs. 4 and 6 the release groove 62 connects passage 47$^a$ and port 63 for a quick release of the brakes. When the release governing valve is moved to graduated release position 47$^a$ and 63 are closed and the release of brake cylinder pressure takes place through passage 49, groove 48 of the pilot valve as will be hereinafter described. When the release governing valve is in quick release position the release of brake cylinder pressure will take place through brake cylinder passage 53—54, brake cylinder port 55 in the main slide valve seat, groove 46 in the main slide valve, port 47 and passage 47$^a$, as previously described. It will, of course be understood that the groove 46 connects ports 55 and 47 when the main slide valve is in full release position.

The pilot valve seat is formed with a port 51$^a$ which is connected by a passage 51 to a port 51$^b$ in the main slide valve seat. In the main slide valve is formed a long groove 58 which in all positions of the main slide valve except emergency position connects port 51$^b$ with a port 60$^a$, this latter port being connected to an exhaust passage 60. In this exhaust passage is arranged a restriction plug 80 provided with a small blow down port 81. The retention chamber is connected by a passage 57 to a port 57$^a$ in the release governing valve seat. The release governing valve is formed with a U-shape port 83 which in the quick release position of said valve connects port 57$^a$ to the exhaust port 63, as shown clearly in Fig. 4. With the release governing valve in graduated release position, as shown in Figs. 1 and 2, port 57$^a$ is closed, so that pressure from the retention chamber 56 can escape to atmosphere only through the small blow down port in the restriction plug 80. When, however, the release governing valve is in quick release position the pressure may freely exhaust from the retention chamber through the release governing valve and the exhaust port 63.

The pilot valve is provided with a small groove 48$^c$ which in the lap position of said valve connects the exhaust port 51$^a$ with a branch port 50$^b$ of the passage 50 leading from the retention chamber. (See Fig. 8.) The purpose of the groove 48$^c$ is to permit the pressure in the retention chamber to slowly blow down when the pilot valve is in lap position. When the pilot valve is in service position, as illustrated in Fig. 7, the chamber 48 connects port 22$^a$ to the passage 49 and the ports and passages 51$^a$, 50$^a$, and 50$^b$ are closed. The passage 57 leads only to the release governing valve, in order that the blow down from chamber 56 shall take place only through the pilot valve and the passage 60 when the release governing valve is in graduated release position.

With the pilot valve 19 in application position, ports 50$^a$, 50$^b$ and 51$^a$ are closed. With the release governing valve in graduated release position, and the pilot valve in lap position, any pressure in the retention chamber 56 will slowly blow down through 50, 50$^b$, the small groove 48$^c$ in the pilot valve and thence through port 51$^a$, passage 51 and passage 60, ports 22$^a$, 49 and 50$^a$ being closed.

The size of the blow-down port 81 in the restriction plug 80 will be proportioned to give the desired blow-down from a given size brake cylinder and will be varied for brake cylinders of different sizes. The exhaust of brake cylinder pressure takes place through this port only when the pilot valve is in release position. It is desirable that the rate of blow-down from the brake cylinders in the release position of the pilot valve shall be uniform for all sizes of brake cylinders in order that the build-up of pressure in the retention chamber 56 shall be uniform, or substantially so, in all equipment. The small groove 48$^c$ permits the blow-down of the pressure in the retention chamber 56 when the pilot valve is in lap position. This groove is of smaller capacity than the port 81, and will be uniform for all triple valves because the retention chamber will be of uniform capacity, in all triple valves.

When the main slide valve is in emergency position, groove 58 is out of register with port 51$^b$ and said port is closed. This will prevent the blow-down of pressure from the retention chamber and from the control chamber through plug 80 without regard to the position of the pilot valve.

The apparatus is charged precisely as described in the aforesaid Patent #1,418,961. All of the operations are precisely as described in said patent except release operations after service applications, with the release governing valve in graduated release position. It is therefore thought to be unnecessary to particularly describe all the operations of the triple valve, and only such features thereof as may be necessary to make the invention herein clear, will be referred to.

To obtain a service application of the brakes a slow brake pipe reduction is made in the usual way, resulting in a corresponding reduction of pressure in the main brake pipe chamber 4 and actuating chamber 14. The undisturbed reservoir pressure in chamber 94 forces the diaphragms 16, 17 and 18 upwardly and moves the pilot valve upwardly to application position thereby placing the passage 49 in communication with passage 22$^a$ through the pilot valve groove 48. Air will flow from chamber 23 through groove 26, port 24, passage 22, port 22$^a$ to the pilot valve; thence through 48 and 49 to the brake cylinder controlling chamber 52 and thence through passage 53 to the brake cylinder. The pressure being thus reduced in chamber 23 will permit brake pipe pressure in chamber 4 to move the actuating piston 10 inwardly to service position, the main slide valve and the graduating valve also moving to service application position. With the main and graduating valves in service position brake pipe air and brake pipe reservoir air will flow to the brake cylinder as described in the aforesaid patent. The brake cylinder pressure will be registered in the controlling chamber 52 between diaphragms 16 and 17, said chamber being connected to the brake cylinder passage 53.

Diaphragm 17 is of larger diameter than diaphragm 16. It is manifest therefore that the increasing pressure in the controlling chamber 52 will create a downward energy against diaphragm 17 greater than the opposed energy against diaphragm 16. The areas of these diaphragms are preferably so proportioned that, for example, if the pressure were reduced in chamber 14 ten pounds below the undisturbed emergency reservoir pressure in chamber 94 it will be necessary to increase the brake cylinder pressure and likewise pressure in chamber 52 two and one-half times greater than the difference between the pressures in said chambers 14 and 94. When a ten pound reduction is made in chamber 14, which is a brake pipe reduction, and twenty-five pounds has been built up in chamber 52, which is brake cylinder pressure, the differential energy created on diaphragms 16 and 17 plus the reduced pressure in chamber 14 will balance and slightly overcome the undisturbed emergency reservoir pressure in chamber 94. Thus it will be seen that the ratio of the built up brake cylinder pressure in chamber 52 to the decreased brake pipe pressure in chamber 14 will be two and one half to one.

When the desired brake cylinder pressure has been built up in chamber 52 the diaphragms will be lowered against the pressure in chamber 94 and the pilot valve 19 will be lowered from its application position to its lap position, thereby stopping the release of pressure from chamber 23 to the brake cylinder. As soon as this flow of air is stopped the graduating valve will be moved to lap position, as described in the aforesaid patent.

In the service position of the main slide valve release groove 46 is out of register with the brake cylinder port 55.

When the triple valve is adjusted for graduated release operations the release governing slide valve is moved to the positions shown in Figs. 1 and 2, thereby moving the release groove 62 out of register with the exhaust port 63 and closing the brake cylinder exhaust passage 47$^a$. This prevents the exhaust of brake cylinder pressure through the release governing valve and through the exhaust 63. Assuming the triple valve to be in service lap position and the desired brake cylinder pressure built up, and a partial release of the brakes is desired, the brake pipe pressure in chambers 4 and 14 is slightly increased. The result of this is that the combined brake pipe pressure in chamber 14 and brake cylinder pressure in chamber 52 will over-balance the emergency reservoir pressure in chamber 94 and the diaphragms and the pilot valve 19 will be lowered to release position, as shown in Fig. 1. Brake cylinder pressure will flow back through chamber 52, passage 49, groove 48 of the pilot valve and port 50$^a$ and passage 50 to the retention chamber 56. Brake cylinder pressure will also flow through port 51$^a$, passage 51, port 51$^b$, groove 58, port 60$^a$, passage 60 to atmosphere through the blow down port in the restriction plug. When brake cylinder pressure and, likewise the pressure in chamber 52, has been reduced sufficiently the pressure in chamber 94 will raise the diaphragms and move the pilot valve to lap position thereby preventing further decrease in brake cylinder pressure. The air pressure in the retention chamber 56 will blow down through the groove 48$^c$ and then out through passage 60. This operation may be continued in steps until the pressure in chamber 14 has been stepped up to an equality with the pressure in chamber 94 at which time all of the brake cylinder pressure will have been released.

The blow down port through the restriction plug is quite small so that the pressure in the brake cylinder and in the chamber 56 will be retained, at a diminishing pressure, for a few seconds. The excess of pressure in chamber 56, that is, the differential energy created on the larger controlling diaphragm 17, opposes the brake cylinder pressure in chamber 52 and tends to move the pilot valve back to lap position. If while there is pressure in the retention chamber 56 the brake pipe pressure is reduced in order to bring about another application of the brakes, or an increased application of the brakes, the pilot valve and the triple valve will again move to application position and air under pressure will be again delivered to the brake cylinder. It is to be noted that when the pilot valve again goes to service position the ports 50$^a$ and 50$^b$ and passage 51$^a$ are closed thereby preventing any further blow down of pressure from the retention chamber 56. The brake cylinder pressure must now be built up an additional amount to overcome the differential energy created on the controlling diaphragm 17 by the pressure retained in chamber 56. Air will continue to flow into the brake cylinder until the pressure has been built up sufficiently to compensate for the loss of pressure in chamber 14 and also to overcome the pressure in chamber 56. This will result in a higher brake cylinder pressure than would have resulted ordinarily, or in the first instance, from the given brake pipe reduction. Should the engine man again increase his brake pipe pressure for a release, or a partial release of brakes, the pilot valve will again connect the brake cylinder controlling chamber 52 to the retention chamber 56 and to atmosphere. Should the engine man then again reduce the brake pipe pressure the brake cylinder pressure will be still further built up. This is what is known as "cycling" and is the ordinary and usual operation when running a train equipped with the standard Westinghouse freight brake down a grade. When the grade is heavy, as hereinbefore pointed out, the cycling operations are frequent and the periods of application and holding and release and re-charging are short, about thirty to sixty seconds, and this short cycling will result in building up a heavy brake cylinder pressure. Where the grade is low the cycling periods are longer, this slow cycling will not build up as heavy a brake cylinder pressure as will the rapid cycling. The amount of pressure retained in the retention chamber 56 will govern the build-up of brake cylinder pressure during the cycling operations. It is manifest therefore that if the release-and-re-charging periods are brief a greater pressure will be retained in the retention chamber 56 and consequently a greater brake cylinder pressure must be built up on the next service operation in order to overcome the retained pressure in chamber 56. In slow cycling the release-and-re-charging operation is long and the pressure in chamber 56 has a greater period of time during which it may blow down through the passage 60. The result of this is that the build up of brake cylinder pressure on the next application and holding operation will not be so great because there will not be the same degree of pressure in chamber 56 that there would have been if the application-and-holding operation followed a short release-and-re-charging operation. It is also manifest that if the release-and-re-charging operation is continued for a considerable period the pressure in chamber 56 will blow down completely and then upon the next service application the brake cylinder pressure will be built up only in proportion to the brake pipe reduction. When the pilot valve is in release position the entire brake cylinder pressure is free to blow down. When the said valve is in lap position any pressure in the retention chamber is free to blow down through the restricted groove 48$^c$. When the pilot valve assumes service position after a release, or after it has assumed release lap position, any pressure remaining in the control chamber or in the retention chamber will be trapped therein and cannot blow down. This trapped pressure in the pilot valve structure will be on opposite sides of the controlling diaphragm, in chambers 52 and 56. It is therefore clear that the amount of pressure trapped in the brake cylinder and in chamber 52 will depend upon the period of time between the release operation of the pilot valve and the movement of said valve to lap position; and that the amount of pressure trapped in the retention chamber 56 will depend upon the period of time between the release operation of the pilot valve and the next service application movement of said valve.

From the foregoing it is clear that the build up of brake cylinder pressure is directly dependent upon the rapidity of the cycling operations. It is also clear that on heavy grades where the cycling operations are rapid the brake cylinder pressure will be built up to a higher degree than on low grades where the cycling operations are not so rapid. It is also clear that the build-up of brake cylinder pressure during cycling operations is entirely automatic and results from the triple valve operations. By this means the use of the usual manually operable loaded pressure retainers is avoided and the triple valve automatically adjusts itself, or adapts itself, to cycling operations on light grades and on heavy grades. This is important because the triple valves are adapted for use in any train on any degree of grade. This avoids the use of retainers of different values and avoids the necessity of equipping a train specially for use on any particular degree of grade as is now the common practice.

To adjust the triple valve for quick release operations the release governing valve is placed in the position shown in Figs. 4 and 6. This position of the release governing valve permits a free release of brake cylinder pressure through the main slide valve, port 47, and passage 47$^a$, release groove 62 and exhaust port 63, precisely as described in the aforesaid Patent 1,418,961. This position of the release governing valve also connects passage 57 through port 83 to the exhaust port 63 thereby providing a free and rapid exhaust of pressure from the retention chamber 56. This free open exhaust, for all practical purposes, prevents the building up of pressure in the retention chamber so that with the release governing valve in quick release position the retention features of the triple valve are rendered inoperative or inactive.

In the form of the apparatus shown in Fig. 9 brake cylinder control chamber 52 is connected to a port in the pilot valve seat by a passage 49, and the retention chamber 56 is connected to a port in the pilot valve seat by passage 100. The pilot valve is provided with a groove 101 which, in the release position of the pilot valve, connects 49 and 100. The retention chamber is also connected to a port in the pilot valve seat by an additional passage 102; and the pilot valve is provided with an additional groove 103 which in the release position of the pilot valve connects passage 102 with an exhaust passage 104. In this exhaust passage is a restriction plug 105 through which is formed a small blow down port. With the pilot valve in release position as shown in Fig. 9 brake cylinder pressure will flow from the controlling chamber 52 through passages 49 and 100, and groove 101 into the retention chamber, and from said chamber pressure will flow to atmosphere through the passage 102, groove 103, passage 104 and the port in the restriction plug. When, however, the pilot valve is moved to lap position both of the passages 49 and 102 will be closed and any pressure remaining in the retention chamber at that time will be trapped therein. In cycling operations with a triple valve constructed as illustrated in Fig. 9 the pressure trapped in the retention chamber 56 will determine the developed brake cylinder pressure for a given brake pipe reduction on the next succeeding cycle. It is clear that the longer the triple valve remains in release position the lower the pressure will be in the retention chamber 56 when the next cycle occurs; and the shorter the time of the release period between cycles, the higher the trap pressure in the retention chamber 56 will be, and necessarily, it will then require a higher developed brake cylinder pressure for a given brake pipe reduction to oppose the trapped pressure in chamber 56.

It will of course be understood that the pilot valve will operate in accordance with the aforesaid Patent No. 1,418,961.

What I claim is:

1. A triple valve operating upon a reduction of brake pipe pressure to admit air to a brake cylinder for an application of the brakes and operating upon an increase in brake pipe pressure to connect the brake cylinder to atmosphere, and provided with a pilot valve subject to brake pipe, brake cylinder and emergency reservoir pressures, said pilot valve operating upon an increase in brake pipe pressure after an application of the brakes to admit brake cylinder pressure to oppose the brake cylinder pressure introduced into said pilot valve structure upon the application of the brakes, and means to permit said latter pressure to slowly blow down to atmosphere in the release and lap positions of the pilot valve.

2. A triple valve operating upon a reduction of brake pipe pressure to admit air to the brake cylinder for an application of the brakes and operating upon an increase in brake pipe pressure to connect the brake cylinder to atmosphere, and provided with a pilot valve having an actuating diaphragm, a controlling diaphragm, an emergency diaphragm, an actuating chamber in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and in its lap position closing said communication.

3. A triple valve operating upon a reduction of brake pipe pressure to admit air to the brake cylinder for an application of the brakes and operating upon an increase in brake pipe pressure to connect the brake cylinder to atmosphere, and provided with a pilot valve having an actuating diaphragm, a controlling diaphragm, an emergency diaphragm, an actuating diaphragm in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and in its lap position closing said communication, and means to permit the pressure in the retention chamber to slowly blow down to atmosphere in the release position and in the lap position of the pilot-valve.

4. A triple valve operating upon a reduction of brake pipe pressure to admit air to the brake cylinder for an application of the brakes and operating upon an increase in pressure to exhaust air from the brake cylinder, and a pilot valve operated by rapidly repeated increases and decreases in brake pipe pressure to build up the brake cylinder pressure.

5. A triple valve operating upon a reduction of brake pipe pressure to admit air to the brake cylinder for an application of the brakes and operating upon an increase in brake pipe pressure to connect the brake cylinder to atmosphere in combination with means operated by reductions of and increases in brake pipe pressure to build up the brake cylinder pressure.

6. A triple valve operating upon a reduction of brake pipe pressure to admit air to the brake cylinder for an application of the brakes and operating upon an increase in brake pipe pressure to connect the brake cylinder to atmosphere in combination with a pilot valve subject to brake pipe, brake cylinder and emergency reservoir pressures, the brake cylinder pressure moving said pilot valve to lap position, and means whereby the brake cylinder pressure will be built up by cycling operations.

7. A triple valve operating upon a reduction of brake pipe pressure to admit air to the brake cylinder for an application of the brakes and operating upon an increase in brake pipe pressure to connect the brake cylinder to atmosphere, and provided with automatically operating means to build up brake cylinder pressure by cycling operations, the extent of the build-up of brake cylinder pressure depending upon the rapidity of the cycling operations.

8. A triple valve operating upon a reduction of brake pipe pressure to admit air to the brake cylinder for an application of the brakes and operating upon an increase in brake pipe pressure to connect the brake cylinder to atmosphere, and provided with a pilot valve to build up brake cylinder pressure by cycling operations, the extent of the build-up of brake cylinder pressure depending upon the rapidity of the cycling operations.

9. A triple valve operating upon a reduction of brake pipe pressure to admit air to the brake cylinder for an application of the brakes and operating upon an increase in brake pipe pressure to connect the brake cylinder to atmosphere and provided with a pilot valve to build up brake cylinder pressure by cycling operations, the extent of the build-up of brake cylinder pressure depending upon the rapidity of the cycling operations, and a release governing valve having a graduated release position and a quick release position, said valve in its quick release position preventing the build up of brake cylinder pressure and in its graduated release position permitting the said build up of brake cylinder pressure.

10. A triple valve operating upon a reduction of brake pipe pressure to admit air to the brake cylinder for an application of the brakes and operating upon an increase in brake pipe pressure to connect the brake cylinder to atmosphere, and provided with a pilot valve having an actuating diaphragm, a controlling diaphragm, an emergency diaphragm, an actuating chamber in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and in its lap position closing said communication, and a release governing valve having a graduated release position and a quick release position, said valve in its quick release position providing a free quick exhaust from the retention chamber and in its graduated release position closing said exhaust from said chamber.

11. A triple valve operating upon a reduction of brake pipe pressure to admit air to the brake cylinder for an application of the brakes and operating upon an increase in brake pipe pressure to connect the brake cylinder to atmosphere, and provided with automatically operating means to build up brake cylinder pressure by cycling operations, the extent of the build-up of brake cylinder pressure depending upon the rapidity of the cycling operations, and a release governing valve having a graduated release position and a quick release position, said valve in its quick release position preventing the build-up of brake cylinder pressure and in its graduated release position permitting the said build-up of brake cylinder pressure.

12. A triple valve operating upon a reduction of brake pipe pressure to admit air to the brake cylinder for an application of the brakes and operating upon an increase in brake pipe pressure to connect the brake cylinder to atmosphere, and provided with a pilot valve having an actuating diaphragm, a controlling diaphragm, an emergency diaphragm, an actuating diaphragm in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and to the atmosphere and in its lap position connecting the retention chamber to atmosphere and closing communication between the controlling chamber and the retention chamber, and in its service position closing communication between the controlling chamber and the retention chamber and between the retention chamber and atmosphere.

13. A triple valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes, and operating upon an increase in brake pipe pressure to connect the brake cylinder to atmosphere, and provided with a pilot valve having an actuating diaphragm, a controlling diaphragm, an emergency diaphragm, an actuating diaphragm in direct communication with the brake pipe, a controlling chamber between the actuating diaphragm and the controlling diaphragm and in communication with the brake cylinder, a retention chamber between the controlling diaphragm and the emergency diaphragm and an emergency reservoir chamber in communication with the emergency reservoir, a pilot valve operatively connected to said diaphragms and in its release position connecting the controlling chamber to the retention chamber and to the atmosphere and in its lap position connecting the retention chamber to atmosphere and closing communication between the controlling chamber and the retention chamber, and means whereby the exhaust from the control chamber and the retention chamber will be closed when the triple valve is in emergency position.

14. A triple valve operating to service position upon a reduction of brake pipe pressure and to release position upon an increase in brake pipe pressure, and provided with a brake cylinder pressure control chamber, a pilot valve, a retention chamber, means to move said pilot valve to release position upon an increase in brake pipe pressure, means whereby the pilot valve in release position will connect the control chamber to the retention chamber and to atmosphere, means to move the pilot valve to lap position, and means whereby the pilot valve in lap position will close communication between the control chamber and the retention chamber and restrict the outlet from the retention chamber to atmosphere.

15. A triple valve operating to service position upon a reduction of brake pipe pressure and to release position upon an increase in brake pipe pressure and provided with a brake cylinder pressure control chamber, a pilot valve, a retention chamber, means operating upon a reduction of brake pipe pressure to move the pilot valve to application position to admit air into the brake cylinder pressure control chamber, said means operating upon an increase in brake pipe pressure to move the pilot valve to release position to connect the control chamber to the retention chamber and to atmosphere, and means to move said pilot valve to lap position to close communication between the control chamber and the retention chamber to connect the retention chamber to atmosphere through a restricted port.

16. A triple valve operating to service position upon a reduction of brake pipe pressure and to release position upon an increase in brake pipe pressure, a pilot valve, a retention chamber, means operating upon an increase in brake pipe pressure to move the pilot valve to release position to connect the brake cylinder to the retention chamber and to atmosphere, and means to move said pilot valve to lap position to close communication between the brake cylinder and the retention chamber and to connect the retention chamber to atmosphere through a restricted port.

17. A triple valve operating to service position upon a reduction of brake pipe pressure and to release position upon an increase in brake pipe pressure, a pilot valve, a retention chamber, means operating upon an increase in brake pipe pressure to move the pilot valve to release position to connect the brake cylinder to the retention chamber and to atmosphere, and means to move said pilot valve to lap position to close communication between the brake cylinder and the retention chamber.

In testimony whereof I hereunto affix my signature.

SPENCER G. NEAL.